United States Patent [19]

Rast

[11] 4,314,743
[45] Feb. 9, 1982

[54] OPTICAL GAIN CONTROL DEVICE

[75] Inventor: Howard E. Rast, Solana Beach, Calif.

[73] Assignee: The United States of America as represented by the Secretary of the Navy, Washington, D.C.

[21] Appl. No.: 95,869

[22] Filed: Nov. 19, 1979

[51] Int. Cl.³ .............................................. G02B 5/23
[52] U.S. Cl. .................................... 350/354; 372/26; 372/10
[58] Field of Search ................... 350/354; 331/94.5 M, 331/94.5 Q; 330/4.3; 250/458

[56] References Cited

U.S. PATENT DOCUMENTS

| | | | |
|---|---|---|---|
| 3,229,221 | 1/1966 | Sorokin et al. | 330/4.3 |
| 3,971,951 | 7/1976 | Rikokawa et al. | 250/458 |
| 4,166,254 | 8/1979 | Bjorklund | 331/94.5 M |

Primary Examiner—William L. Sikes
Assistant Examiner—Léon Scott, Jr.
Attorney, Agent, or Firm—Richard S. Sciascia; Ervin F. Johnston; Thomas Glenn Keough

[57] ABSTRACT

An optical gain control device limits the light intensity incident on a photodetector or photomultiplier. A fluorescent medium is interposed between a monitored source of electromagnetic energy and the detector and is irradiated by a local oscillator. The irradiation is absorbed by the fluorescent material which undergoes an electronic transition from the ground state to a first excited state. Photons impinging on the fluorescent material from the monitored electromagnetic source cause another transition to a second, more excited state. When the relaxation occurs from the higher state back to the ground, the material fluoresces. Because the magnitude of the local oscillator irradiation is kept within prescribed limits, the number of ions in the fluorescing material which are brought to the first excited state stay within certain limits. Consequently, the impinging monitored electromagnetic energy cannot excite more ions to the second higher state than were irradiated to the first excited state. Thus, high energy bursts of the monitored electromagnetic energy will not be transmitted to the detection device. Including a blocking filter having one passband which directly receives the monitored electromagnetic energy and another filter having a different passband which is located between the fluorescing material and the detection device, the transmission of dangerous levels of electromagnetic energy is further prevented. Protection of the detection device is automatic and does not depend on any mechanical coaction to assure quick response and long-term high reliability.

17 Claims, 6 Drawing Figures

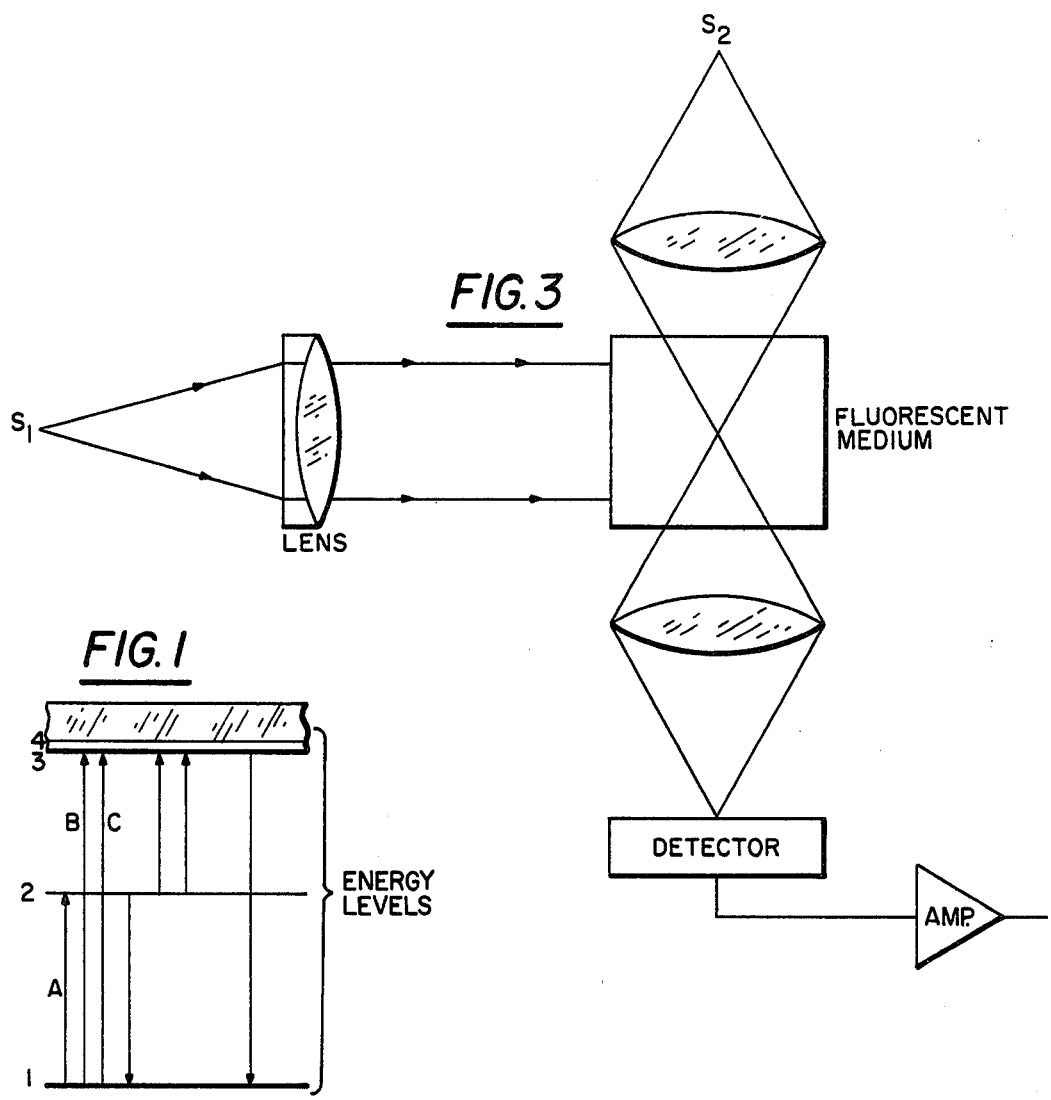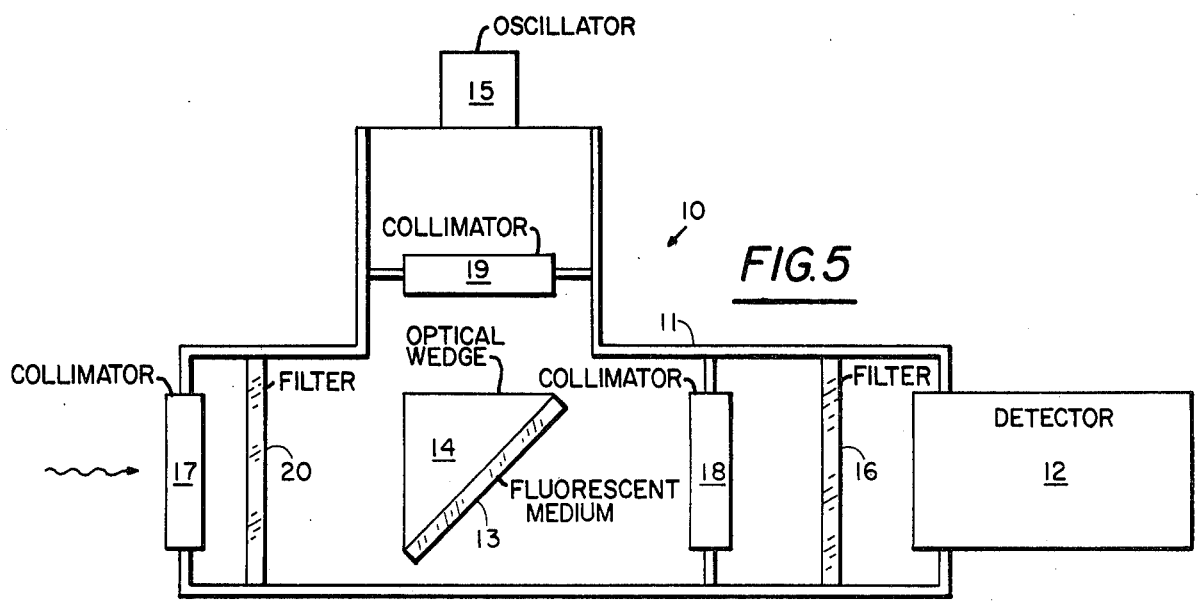

OPTICAL GAIN CONTROL DEVICE

CROSS REFERENCE TO RELATED APPLICATIONS

This is related to an application entitled "Passive High-Speed Automatic Shutter for Imaging Devices" by Howard E. Rast, Jr., U.S. Pat. Office Ser. No. 874,093 and now U.S. Pat. No. 4,176,919.

BACKGROUND OF THE INVENTION

Sensitive photodetectors, photomultipliers, etc., are susceptible to being blinded, saturated or otherwise being driven into a nonlinear range. During high intensity flashes, data is lost and the sensing devices can and do get damaged.

Perhaps the first type of light intensity control that comes to mind is found in an ordinary camera. To obtain a satisfactory exposure on a photographic film, a variable aperture iris is adjusted to predetermine the amount of light incident on the film to prevent overexposure or underexposure. This well-known capability also is inherently present in the human eye, for in the eye, the iris varies the aperture through which light passes onto the retina and automatically provides protection.

Sophisticated modern optical systems have included a variety of mechanical or solenoid operated shutters to control light intensity. An example of this is disclosed by C. J. Seur in his U.S. Pat. No. 2,868,100 entitled "Camera Comprising a Pick-up Tube and a Lens Objective with a Variable Effective Aperture Ratio". An elastic taut light-previous skin is provided with a means to adjust its tension. As the tension is varied, the permeability of the skin is changed and the quantity of light striking a photocathode of a pick-up tube will not be overexposed. While a noteworthy advance in the state-of-the-art, the mechanical coaction, allegedly automatic, leaves something to be desired when it is considered that rapidly varying flashes of ambient light might be expected.

Similarly, the principal deficiency of many of the other mechanical shutter or iris devices is that they too have slow responses, being on the order of 50 to 100 msec. A typical system sensing electromagnetic energy from a relatively low ambient light background can be blinded, driven nonlinear or irreversibly damaged by sudden light flashes or intense light sources such as flares, flashlamps, pulsed lasers, or the sun. The sophisticated sensing systems, particularly those employed by the military for surveillance, cannot risk being neutralized by overloading bursts of radiation. Thus, there is a continuing need in the state-of-the-art for a device which automatically and rapidly protects photosensing devices from sudden intense bursts of radiation.

SUMMARY OF THE INVENTION

The present invention is directed to providing an apparatus for automatically limiting the magnitude of monitored electromagnetic energy from impinging on a processing device such as a photodetector or photomultiplier. A radiation providing means is located to intercept the monitored electromagnetic energy for providing responsive radiation levels which are projected onto the processing device when signals of a predetermined frequency impinge on it. An electromagnetic energy emitting means is disposed adjacent to the radiation providing means for emitting electromagnetic energy in a frequency range different than the predetermined signals to raise the excitation state of the radiation providing means to a first level in a given concentration to assure that the radiation providing means projects the responsive radiation levels onto the processing device.

It is a prime object of the invention to provide a device for limiting the magnitude of light intensity which falls on a photosensitive device.

A further object of the invention is to provide an electronic or optical analog to a mechanical iris or shutter which automatically protects a photosensing device from high levels of light intensity.

Still another object of the invention is to provide a photodetector or photomultiplier protection device which has a fast response time to limit the transmission of high intensity energy levels originating from blinding or damaging bursts of radiation.

Another object is to provide a self limiting, automatic, quick reacting electronic device for protecting photodetectors and photomultipliers.

Another object is to provide an electronic device which protects photodetectors and photomultipliers from intense levels of radiation and additionally blocks frequencies other than a frequency of interest.

Still a further object is to provide a photodetector and photomultiplier protection device which is relatively uncomplicated and capable of being manufactured inexpensively.

These and other objects of the invention will become more readily apparent from the ensuing specification and claims when taken with the drawings.

BRIEF DESCRIPTION OF THE DRAWINGS

FIG. 1 is a hypothetical energy level diagram of a typical fluorescent material.

FIG. 3 sets forth an experimental arrangement for partially illustrating the theory underlying this inventive concept.

FIG. 5 is a preferred form of the optical gain control device.

DESCRIPTION OF THE PREFERRED EMBODIMENT

Before the structure of the preferred embodiment is discussed, a basic understanding of the theory involved should be in hand to appreciate the salient features of this invention. In this regard, attention is directed to the energy level diagram of FIG. 1 which depicts a hypothetical, but typical material such as a solid having impurity centers like transition metal ions, rare earth ions, or actinide ions.

Impinging radiation at a frequency $\nu_{12}$ is absorbed by the selected material causing an electronic transition from the ground state, 1, to an excited state, 2. If the lifetime of the excited state is of sufficiently long duration, additional incident photons of frequency $\nu_{23}$ and $\nu_{24}$ corresponding to the energy gap between level 2 and 3 can also be absorbed by the material. By means of transmission spectroscopy, the portions of the excited energy levels can be determined. The hypothetical energy level diagram depicted in FIG. 1 would result in a spectrogram as shown in FIG. 2.

Figure 2:
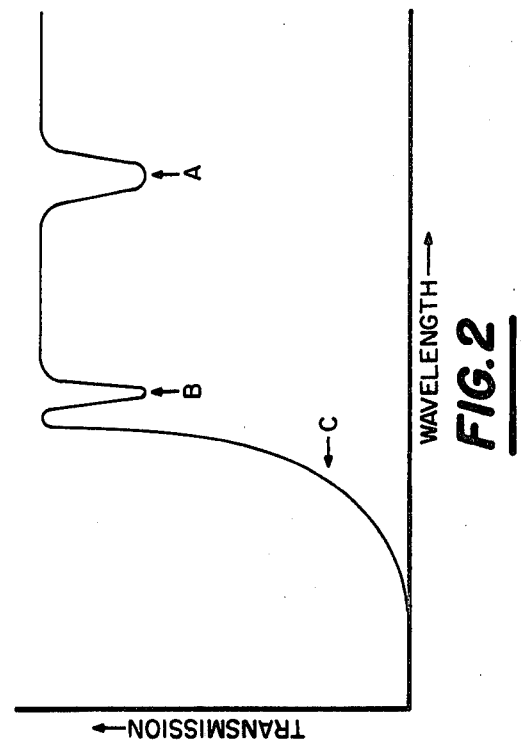
FIG. 2 is a spectrogram of the typical fluorescent material having the energy levels as set forth in FIG. 1.

In FIG. 2, band A corresponds to the electronic transition, $h\nu_{12}$ of FIG. 1, with h, of course, being equal to Planck's constant ($h = 6.63 \times 10^{-34}$ Joule-seconds). The bands B and C correspond respectively to the energy gap $h\nu_{13}$ and $h\nu_{14}$. At this point, might it be noted that the abscissa in FIG. 2 is given as wavelength since most spectrum measuring instruments record spectra as a function of wavelength. The spectrogram of FIG. 2 can be easily converted to energy differences by the relation $h\nu = (nxc/\lambda)(nc/\lambda)$ where $\lambda$ is the wavelength measured in air, n is the refractive index of air, and c is the speed of light in a vacuum ($3 \times 10^8$ meters per second).

The arrow in FIG. 1 which corresponds to the energy difference $h\nu_{31}$ represents a fluorescence transition. This phenomenon is well known and has gained acceptance in the art by investigators who refer to such research as double resonance, excited-state spectroscopy or optical pumping experiments.

When monochromatic radiation of frequency $\nu_{12}$ illuminates the sample, the radiation interacts with N ions and a certain fraction, $n_2$, of the ions will be excited and occupy the level 2 shown in FIG. 1. If, simultaneously, another monochomatic source illuminates the sample with radiation of energy $h\nu_{23}$ or $h\nu_{24}$, a certain fraction of the excited ions in level (state) 2 will execute transitions to levels 3 or 4 and instrumentation would show a different spectrum than that shown in FIG. 2. The reason for the difference arises because most molecules are in the ground state, level 1. Because relaxation times are usually very fast and because common sources of light do not normally excite a great number of ions, the occupancy of state 2 is very low and one does not observed the transitions $h\nu_{23}$ or $h\nu_{24}$.

However, the recent development of intense flash lamps and lasers readily enable the population of excited states and the observation of transitions between excited states has been observed in a great many cases. Thus, the total number of centers excited by steady illumination from any given level is proportional to the impinging light intensity. Equations describing the time rate of change of excitation in the idealized example shown in FIG. 1 are as follows:

$$\left.\begin{aligned}\frac{dn_1}{dt} &= -\alpha I(\nu_{12}) + \beta N_3 + \gamma N_2 \\ \frac{dn_2}{dt} &= \alpha I(\nu_{12}) - \gamma N_2 - \mu I(\nu_{23}) \\ \frac{dn_3}{dt} &= \mu I(\nu_{23}) - \beta N_3\end{aligned}\right\} \quad (1)$$

where $n_1 + n_2 + n_3 = N$ and $\alpha, \beta, \gamma$, and $\mu$ are first order rate constants corresponding to the reciprocal lifetimes of the given states.

It naturally follows that under steady state illumination, the occupany of the various levels does not change, and $dn_1/dt = dn_2/dt = dn_3/dt = 0$. Now the equations (1) can be solved to find the steady state occupancy of the various levels, $$\left.\begin{aligned}N_2 &= \frac{\alpha I(\nu_{12}) - \mu I(\nu_{23})}{\gamma} \\ N_3 &= \frac{\alpha I(\nu_{12})}{\beta} = \frac{\mu I(\nu_{23})}{\beta} \\ \text{and } N_1 &= N - (n_2 + n_3)\end{aligned}\right\} \quad (2)$$

Note that the fraction of ions occupying state 2 is $$f = \frac{n_2}{N} = \frac{(\alpha I(\nu_{12}) - \mu I(\nu_{23}))}{\gamma N}$$

and is proportional to the incident photon flux at a frequency $\nu_{12}$. This fraction can be increased by merely increasing the intensity, I, of $I(\nu_{12})$ or by selecting a material in which $\gamma$ is small. Stated another way, the lifetime of state 2 is $\tau = 1/\gamma$, and one may increase the occupancy of state 2 by selecting materials which have long lifetimes. These states are sometimes referred to as metastable states and can have lifetimes which vary over an extreme range in time.

The next step in the theoretical analysis is to apply the above described information and perform the experiment schematically represented in FIG. 3. A source of monochromatic radiation $S_1$, emits light of frequency $\nu_{12}$ which is collimated and directed into a medium as described above having the energy level diagram of FIG. 1. At the same time, another monochromatic source $S_2$, emits radiation of frequency $\nu_{23}$ which is focussed into the material and which traverses the material and thence is focussed onto a photodetector. If the intensity of source $S_1$ is very low, the excited ion population at level 2 is very low and the signal detected at the detector does not change. However, as the intensity of $S_1$ is increased, an appreciable fraction of the ions begin to occupy state 2, thereby giving rise to transitions from state 2 to state 3. If, indeed, sufficient centers occupy state 2, the detected signal at the detector will be significantly reduced. In no case, however, can the reduction in intensity exceed $n_2$ photons since the source $S_2$ is monochromatic and only permits the material to absorb photons when state 2 is occupied.

Stated another way, if the occupancy of state 2 is $n_2$ and at any given time, M photons traverse the sample, the reduction in signal intensity at the detector is exponentially proportional to the ratio of $n_2/M$. Disregarding reflection and scattering effects, if the absorption cross section for ions in state 2 is $\sigma_2$ the ratio of signals is $\mathrm{Exp}(-\sigma_2 n_2 x)$ where x is the thickness of the sample.

Figure 4:
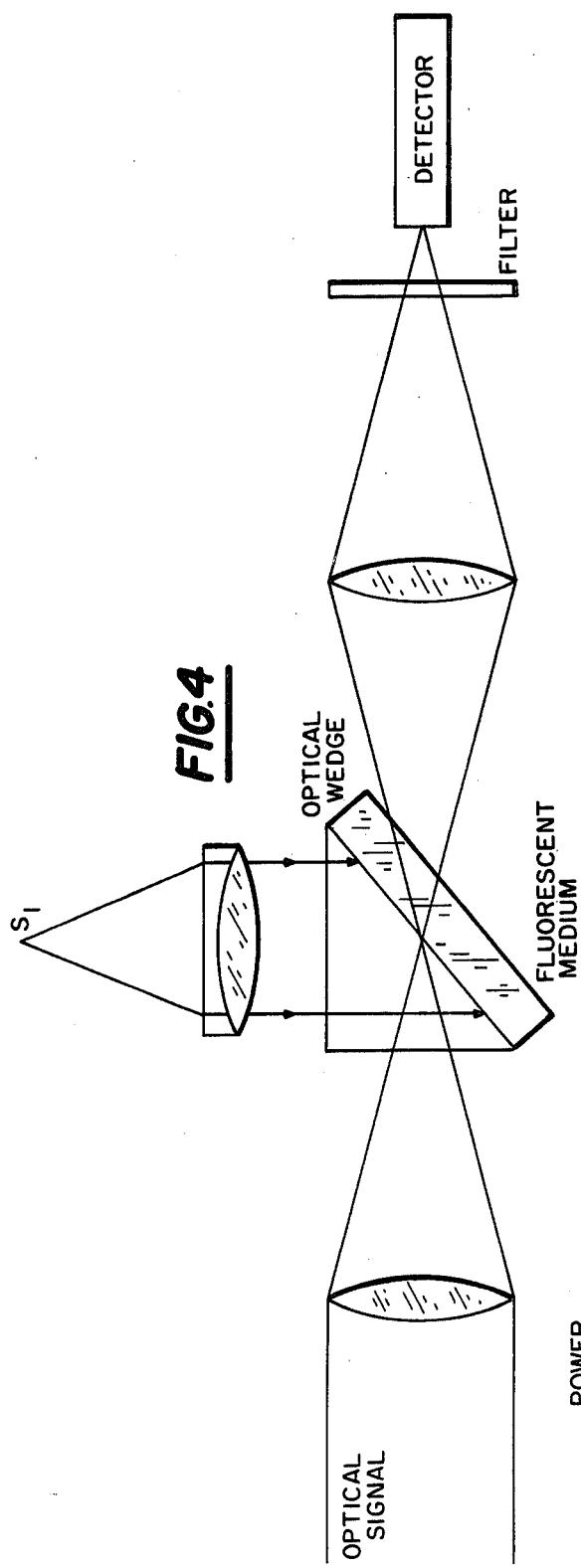
FIG. 4 helps demonstrate the theory underlying this inventive concept.
Figure 6:
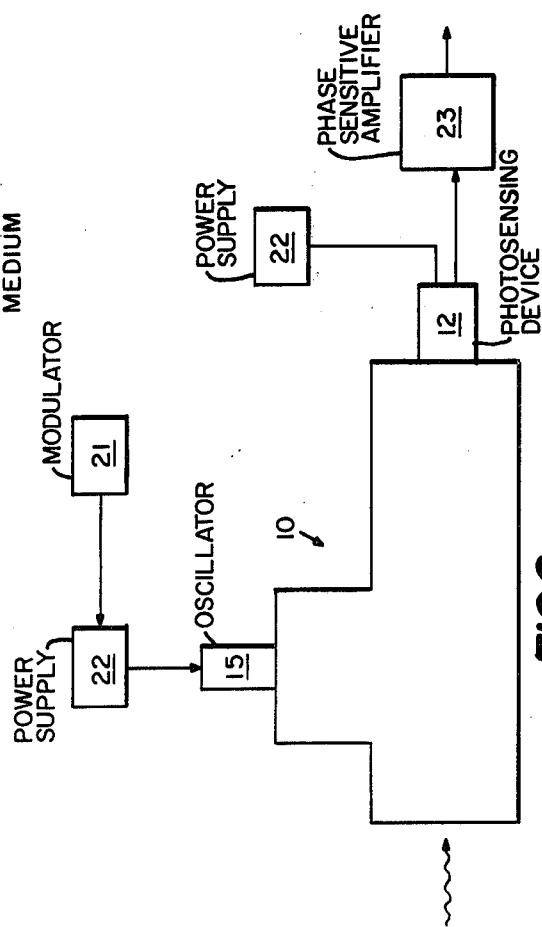
FIG. 6 shows the optical gain control device operatively connected to provide protection for photosensing devices such as photodetectors and photomultipliers.

Another experimental arrangement is shown in FIG. 4 to aid in the theoretical understanding of the inventive concept of this invention. In this arrangement, the monochromatic source, $S_1$, illuminates the sample through an optical wedge to provide uniform illumination through the face of the sample. The sample is monitored by a detector to the right, and a monochromatic filter, such as a narrowband interference type, is positioned so that only radiation corresponding to the fluorescence transition, $\nu_{31}$, is detected. If the intensity of $S_1$ is adjusted so that an appreciable fraction of ions is in state 2, transitions from 2 to 3 and 4 can take place. Since state 4 is close to 3, nonradiative relaxation, that is generation of heat, for example, can take place (once level 4 is occupied) from the level 4 to 3 resulting in fluorescence emission which can be detected by the photodetector.

However, as stated above, no more photons can be detected at any time than the occupancy of state 2. Thus, by controlling the intensity of source $S_1$ the magnitude of the detected signal is limited. Moreover the provision of the continuum of states 3 and 4 allows one to detect frequencies over a large spectral range since relaxation to metastable state 3 occurs via radiationless or photon transitions which largely are evidenced by the generation of heat.

The importance of the arrangement of FIG. 4 is that an automatic iris or intensity limiting device is created. When a given light signal is to be detected, the intensity of $S_1$ is varied from zero until a fluorescence signal, due to the fluorescence transition $\nu_{31}$ and, greater than the predetermined threshold limit set by the occupancy of state 2, would deplete level 2 if the photon flux density exceeded $n_2$. The material would behave as if it were transparent. Further, the transmitted signal would be intercepted by the blocking filter thereby protecting the detector.

Further insight into the mechanism of the system can be had by examining the time dependence of the various states. As referred to above, the steady state occupancy of the various levels was shown in the three equations grouped together under equation (2) above. In the derivation of these equations several simple assumptions have been made. Among these is the assumption that relaxation from states 4 to 3 is extremely fast; this has been shown to be true for photon-coupled states that are very close in energy. Another assumption is that $\alpha I(\nu_{12}) \gtreqless \mu I(\nu_{23})$ since otherwise no transitions could occur from 2 to 3 or 4.

By inserting measured values of the parameters in equation (2) we can get some index of performance as applied to a practical case.

Take $I(\nu_{12}) = 5 \times 10^{15}$ photons sec$^{-1}$
$I(\nu_{23}) = 10^{12}$ photons sec$^{-1}$
$\alpha = \nu = 5 \times 10^8$ sec$^{-1}$
$\beta = 10^6$ sec$^{-1}$
$\gamma = 10^5$ sec$^{-1}$
$N = 10^{20}$
or P $n_2 \times 2.5 \times 10^{19}$; $n_3 \times 2.5 \times 10^{15}$; $n_1 = 7.5 \times 10^{19}$ Thus, once a steady state is attained, a significant fraction of the ions, 25%, would occupy the metastable state 2, but only $2.5 \times 10^{15}$ would, at any time, occupy state 3 and be available for detection in the fluorescent transition, from state 3 to state 1.

If $\mu I(\nu_{23}) \gtreqless \alpha I(\nu_{12})$, then state 2 is depleted, but in no case can $n_3$ exceed $(\alpha/\beta) I(\nu_{12})$. In the numerical example, the upper limit for $n_3$ is $2.5 \times 10^{18}$.

Looking now to the time dependence of the various states, we make the assumption that $I(\nu_{12})$ is constant and that $I(\nu_{23})$, initially 0, is a function of time. Equation (2) can be integrated to give $$\left. \begin{array}{l} n_2 = \dfrac{\alpha I_o}{\gamma}(1 - e^{-\gamma t}) - \mu e^{-\gamma t} \int I(t) e^{\gamma t} dt \\ \\ n_3 = \mu e^{-\beta t} \int I(t) e^{\beta t} dt \\ \\ \text{where } I_o = I(\nu_{12}) \text{ and } I(t) = I(\nu_{23}) \end{array} \right\} \quad (3)$$

A common occurrence is that I(t) is a pulse which can be described quantitatively as $$I(t) = I_o \text{(constant) for } \tau \leq t \leq \tau + \Delta \tau$$
$$= 0 \quad \text{otherwise}$$

Then, equations (3) become $$n_2 = \frac{\alpha I_o}{\gamma}(1 - e^{-\gamma t}) - \frac{\mu}{\gamma} I (\tau \leq t \leq \tau + \Delta \tau) \quad n_3 = \frac{\mu}{\beta} I$$

Again, the upper limit to $n_3$ is set by the occupancy of $n_2$ because if I exceeds $(\alpha/\mu)I_o(1-e^{-\gamma t})$, $n_2$ is depleted and the maximum occupancy of state 3 is $n_3 = (\alpha/\beta) I_o (1-e^{-\gamma t})$ which decays to zero after the pulse has passed.

From the foregoing theoretical analysis of the operation of the embodiment of this invention an optical gain control device 10 has evolved as set out in FIG. 5. A housing 11 holds a detector or photomultiplier 12 at one end which is sensitive to 0.38 micron radiation. The photosensing device is axially aligned with radiation sought to be monitored and indicated generally by the incoming arrow to the left of the figure. In axial alignment a fluorescent medium 13 mounts an optical wedge 14 for intercepting the radiation to be monitored. The fluorescent medium is a single crystal of calcium tungstate or cadmium fluoride which is doped with a rare earth ion such as Erbium or Thulium. Orthogonally disposed with respect to the axis just referred to in the housing, a pump or local oscillator 15 irradiates the fluorescent medium with the reference frequency $S_1$. The local oscillator can be a gallium arsenide light emitting diode or diode laser capable of intense infrared emission in the 0.8 to 1.2 micron range.

A narrow band interference filter 16 is disposed adjacent the photodetector and is tuned to 0.38 microns.

Elements 17, 18 and 19 represent optical components which serve to focus or, preferably, collimate light. The supporting structure for the elements 17, 18 and 19 are opaque to assure that only collimated energy is transmitted.

A sharp cut blocking filter 20 is positioned to receive the monitored radiations. It has a characteristic which does not permit the transmission of energy below a 0.45 micron wavelength while transmitting the wavelengths in excess of 0.45 microns.

The optical gain control device is coupled to an electronic arrangement which forms an overall protective system. A modulator 21 controls the magnitude of a power supply 22, which in turn drives local oscillator 15 which provides the level 2 excitation state in a given concentration. The photosensing device 12 is supplied from a power pack 22 and any detected signals from the photosensing device are amplified by a phase sensitive amplifier 23. The signal is passed on for additional signal processing by following circuitry.

The monitored radiation for raising the excitation states to level 3, level 4 enters the housing through sharp cut blocking filter 20. Its passband is such that only the wavelengths greater than 0.45 microns pass. The energy radiated by the fluorescent medium 13 is in a different frequency range than the monitored radiation so that only the 0.38 micron energy impinges on the photodetector. The narrowband interference filter 16 assures that blinding or otherwise damaging levels of radiation outside the 0.38 micron frequency do not reach the photosensing device. Energy within the 0.38 micron range is held to acceptable levels for the photosensing device by reason of the magnitude of the intense infrared emission in the 0.8 to 1.2 micron range which is emanated from the local oscillator 15.

Obviously, many other modifications and variations of the present invention are possible in the light of the above teachings. It is therefore to be understood that within the scope of the appended claims the invention may be practiced otherwise than as specifically described.

What is claimed is:

1. An apparatus for automatically limiting high energy bursts of monitored electromagnetic energy from impinging on a processing device such as a photodetector comprising:

means located to intercept monitored electromagnetic energy for providing responsive radiation levels that project onto the processing device when signals of a predetermined frequency impinge thereupon and means disposed adjacent the radiation providing means for emitting electromegnetic energy in a frequency range different than the predetermined frequency signals to raise an excitation state of the radiation providing means to a first level in a given concentration to assure that the radiation providing means projects responsive radiation levels onto the processing device, the radiation providing means includes a fluorescent material having the property of being raised to a first lower excitation state when the electromagnetic energy in a frequency range different than the predetermined frequency signals impinges on it and the fluorescent material further has the property of fluorescing not beyond a certain magnitude as determined by an intensity of the electromagnetic energy impinging on it from the electromagnetic energy emitting means irrespective of magnitudes of said predetermined frequency signals.

2. An apparatus according to claim 1 in which the fluorescent material is a crystal of calcium tungstate doped with erbium and the electromagnetic energy emitting means is a gallium arsenide infrared emitter.

3. An apparatus according to claim 1 in which the fluorescent material is a crystal of calcium tungstate doped with thulium and the electromagnetic energy emitting means is a gallium arsenide infrared emitter.

4. An apparatus according to claim 1 in which the fluorescent material is a crystal of cadmium flouride doped with erbium and the electromagnetic energy emitting means is a gallium arsenide infrared emitter.

5. An apparatus according to claim 1 in which the fluorescent material is a crystal of cadmium fluoride doped with thulium and the electromagnetic energy emitting means is a gallium arsenide infrared emitter.

6. An apparatus according to claim 1 in which the electromagnetic energy emitting means emits electromagnetic energy in an infrared range of 0.8 to 1.2 $\mu m$.

7. An apparatus according to claim 1 further including:

means for blocking substantially all electromagnetic energy outside of the frequency range of the predetermined frequency signals, the blocking means being disposed to intercept all electromagnetic energy before it reaches the radiation responsive means.

8. An apparatus according to claim 7 further including:

means for filtering substantially all signals outside of a predetermined fluorescing range which is discrete from the frequency range of the signals passed by the blocking means, the filtering means is interposed between the radiation providing means and the processing device.

9. An apparatus according to claim 8 in which the blocking means is a sharp cut blocking filter passing electromagnetic energy having a wavelength greater than 0.45 $\mu m$ and the filtering means is a narrow band interference filter tuned to a wavelength of 0.38 $\mu m$.

10. An apparatus according to claim 8 further including:

means for housing the blocking means, the radiation providing means, and the filtering means being shaped to orient the blocking means, the radiation providing means, the filtering means and processing device in a sequential alignment with the electromagnetic energy emitting means being orthogonally disposed thereto.

11. An apparatus according to claim 10 further including:

means disposed within the housing means for collimating the passage of electromagnetic energy therethrough.

12. An apparatus according to claim 11 in which the fluorescent material is a crystal of calcium tungstate doped with erbium and the electromagnetic energy emitting means is a gallium arsenide infrared emitter.

13. An apparatus according to claim 11 in which the fluorescent material is a crystal of calcium tungstate doped with thulium and the electromagnetic energy emitting means is a gallium arsenide infrared emitter.

14. An apparatus according to claim 11 in which the fluorescent material is a crystal of cadmium flouride doped with erbium and the electromagnetic energy emitting means is a gallium aresenide infrared emitter.

15. An apparatus according to claim 11 in which the fluorescent material is a crystal of cadmium fluoride doped with thulium and the electromagnetic energy emitting means is a gallium arsenide infrared emitter.

16. An apparatus according to claim 11 in which the electromagnetic energy emitting means emits electromagnetic energy in an infrared range of 0.8 to 1.2 $\mu m$.

17. An apparatus according to claim 1 further including:

means for housing the radiation providing means the electromagnetic energy emitting means and the processing device being shaped to orthogonally locate the electromagnetic energy emitting means with respect to an axis extending through the radiation providing means and the processing device.

* * * * *